(12) United States Patent
Shinsato et al.

(10) Patent No.: US 9,631,639 B1
(45) Date of Patent: Apr. 25, 2017

(54) STORAGE SYSTEM WITH NOISE REDUCTION

(71) Applicant: NetApp, Inc., Sunnyvale, CA (US)

(72) Inventors: Macen Shinsato, Wichita, KS (US); Ivan Quiroz, Wichita, KS (US); Navaneeth Karthikeyan, Wichita, KS (US); Jonathan Nelson, Wichita, KS (US); Ryan Binter, Wichita, KS (US); Phani Durga Siva Sai Venkat Inturi, Wichita, KS (US); Avinash Gariki, Wichita, KS (US); Tochukwu Uzokwe, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/928,139

(22) Filed: Oct. 30, 2015

(51) Int. Cl.
*A61F 11/06* (2006.01)
*F04D 29/66* (2006.01)
*F04D 29/38* (2006.01)
*F04D 27/00* (2006.01)
*F24F 13/24* (2006.01)

(52) U.S. Cl.
CPC ......... *F04D 29/665* (2013.01); *F04D 27/001* (2013.01); *F04D 29/38* (2013.01); *F24F 13/24* (2013.01); *F24F 2013/247* (2013.01)

(58) Field of Classification Search
CPC ..... F24F 13/24; F24F 2013/247; F04D 29/38; F04D 27/001; F04D 29/665
See application file for complete search history.

(56) References Cited

U.S. PATENT DOCUMENTS

2015/0104029 A1* 4/2015 Cheng ................... G06F 1/20
381/71.3

* cited by examiner

*Primary Examiner* — Muhammad N Edun
(74) *Attorney, Agent, or Firm* — Haynes and Boone, LLP (57) ABSTRACT

Systems and techniques for cancelling fan noise by providing an anti-noise waveform are disclosed. In some embodiments, the systems and techniques include receiving, at a fan, a pulse width modulated signal from a power supply. A fan blade of the fan is rotated at a spin speed that is measured by a first sensor. A second sensor detects a position of the fan blade. Based on the spin speed and the position, an anti-noise waveform is generated that is configured to cause destructive interference with a fan noise of the fan. An audio signal is output that corresponds to the anti-noise waveform to cause destructive interference with noise caused by the spinning blades of the fan.

17 Claims, 4 Drawing Sheets

STORAGE SYSTEM WITH NOISE REDUCTION

TECHNICAL FIELD

The present description relates to noise reduction and, more specifically, to techniques and systems for cancelling fan noise in a storage system.

BACKGROUND

Traditional data centers use high density storage systems to store and manage large amounts of data. High density storage systems may include storage memory that is positioned in a relatively small storage space. These storage systems may generate large amounts of heat due in part to the close proximity of the storage system components and large number of operations being performed to access the data from the storage memory.

Currently, cooling fans are used to remove the heat from the components of the storage system. A side-effect of the cooling fans is that large amounts of noise can be generated from the spinning fan blades of the cooling fans. The generated noise is a problem that is increased by, for example, adding additional fans and increasing fan spin speed.

As storage systems are improved to provide even higher storage density, it has become increasingly difficult to cool these storage systems while meeting acoustic requirements. Fan blades have been developed with various configurations to minimize the noise generated by fans; however, these improvements on their own are only able to provide limited improvements for reducing fan noise.

Another fan technology improvement in high density storage systems is to implement variable speed high revolution per minute (RPM) fans. These high RPM fans may spin fan blades with reduced speeds during normal operation to offer noise reduction benefits. However, when a failure or service scenario occurs, fan blade spin speed may be increased, thereby temporarily exceeding noise requirements until the failure or service scenario is resolved.

While high RPM fans and improved fan blade technology have helped reduce fan noise, these solutions have reached limits such that these technologies are no longer able to keep up with both the cooling and acoustic requirements of the high density storage systems of today.

Therefore, a need exists for systems and techniques that can meet both cooling and acoustic requirements for higher density storage systems. Thus, while existing fan noise reduction technology has been generally adequate, the techniques described herein provide improved performance and efficiency.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments provide a system, method, and machine-readable medium that provide a fan noise reduction technique that reduces/cancels noise generated by one or more spinning fan blades. In some examples, fan noise reduction may refer to cancelling out portions, or an entire amount, of the noise generated from the spinning of the fan blades. In particular, an anti-noise waveform (i.e, a noise cancelling waveform) is generated that is output by an audio output device, such as a speaker. The output anti-noise waveform causes disruptive interference with the noise generated by the spinning fan blades.

In some examples described herein, one or more sensors may monitor a position of a fan blade and a fan blade spin speed corresponding to the fan blades of a fan. The fan blade position and fan blade spin speed may be processed by a signal processor to generate a waveform, such as a sine wave, that corresponds to the noise generated by the spinning fan blades. The sine wave may have a phase that is shifted by 180 degrees from the phase of the noise waveform of the spinning fan blades. This anti-noise waveform may be output by a speaker to cause disruptive interference with the noise generated by the spinning fan blades, and thereby reduce/cancel the noise of the spinning fan blades. In this example, reducing/cancelling the noise of the spinning fan blades refers to reducing the overall decibel level of the fan noise due to cancelling at least some portions of the fan noise with the anti-noise.

Further, the system, method and machine readable medium additionally provide an improved technique for regulating fan speed to a stabilized fan speed. The fan blade spin speed corresponding to the blades of the fan may be monitored and transmitted back to the power supply. The power supply may then adjust the duty cycle of the power provided to the fan based on the received fan blade spin speed. For example, a power supply controller may identify when the fan blade spin speed deviates above or below preconfigured thresholds. The power supply controller may increase or decrease power supplied to the fan by the power supply to adjust the fan blade spin speed responsive to the identified fan spin speed deviations. Thus, the fan blade spin speed may be stabilized and maintained at a more constant speed.

The embodiments disclosed herein may provide several advantages. First, the output of the anti-noise waveform causes a reduction in the decibel levels of the fan noise. For fans implemented in storage systems, the reduction in fan noise may allow the storage systems to meet acoustic requirements. In addition, by reducing fan noise in storage systems, storage systems may be able to include additional fans, spin fan blades at higher speeds, and so forth, while maintaining noise levels that are still within acoustic requirements. Second, by stabilizing the fan blade spin speed, the variance of the fan noise is reduced. This allows a signal processor to align an anti-noise waveform more closely with the fan noise waveform, thereby providing the performance advantage of greater noise reduction/cancellation. Of course, it is understood that these features and advantages are shared among the various examples herein and that no one feature or advantage is required for any particular embodiment.

Figure 1:
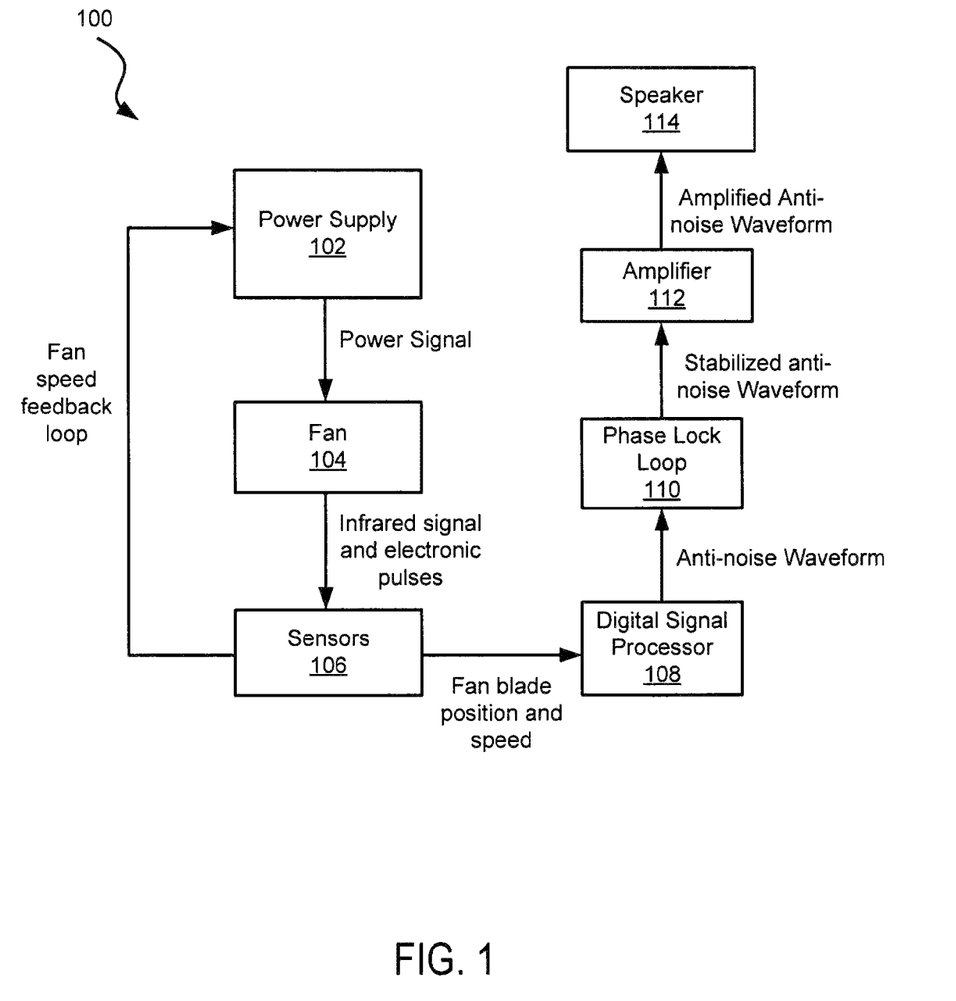
FIG. 1 is a schematic diagram of an exemplary architecture for cancelling fan noise according to aspects of the present disclosure.

FIG. 1 is a schematic diagram of an exemplary architecture 100 for cancelling fan noise according to aspects of the present disclosure. In the present example, the architecture 100 is included within a storage system, however, in other examples, the architecture 100 may be implemented in other types of systems to offer the benefit of noise reduction.

Each component described in the architecture 100 may be structured with a communicative coupling to one or more other components in the architecture 100. In some examples, communicative couplings include, for example, one or more wires, cables, buses, adapters, and so forth.

The architecture 100 includes a power supply 102. In the present example, the power supply is structured as a voltage regulating power supply that provides a pulse width modulated (PWM) power signal to a fan 104.

In some examples, the power supply 102 includes a power supply controller that controls the frequency and duty cycle of the PWM power signal, and is structured to adjust the PWM power signal based on fan blade speed measurements to maintain a stable fan blade spin speed. In other examples, the power supply controller is a separate component from the power supply that is communicatively coupled to the power supply.

In some examples, the pulse width of a power signal is modulated from the power supply 102 to supply power to the fan 104. In some examples, the power signal is configured with a pulse width and frequency to supply an amount of power to the fan 104 to spin the fan blades at 5200 RPMs. For example, the power supply 102 may provide a power signal having a 25 kHz frequency and a 30% duty cycle to achieve the 5200 RPM fan blade spin speed.

RPMs may also be increased or decreased by adjusting the frequency and duty cycle of the power signal. In the present example, the duty cycle represents the amount of the time in which the power supply is providing power relative to the amount of time that the power supply is providing low or no power. While the previous example describes a 25 kHz frequency and 30% duty cycle, various duty cycles, voltages, and frequencies may be utilized. Further, in some examples, the power supply 102 may be structured to provide a constant, non-PWM power signal.

The power supply 102 also may represent a single power supply or a plurality of power supplies. For example, components such as the sensors 106, digital signal processor 108, phase lock loop 110, amplifier 112, and speaker 114 may use a same power supply, or one or more different power supplies.

The fan 104 is structured to receive the power signal from the power supply 102. The fan 104 may represent a single fan or a plurality of fans.

In the present example, the fan 104 is structured with a fan motor that receives the power and causes the fan blades to rotate around an axis. In some examples, the spin speed of the fan blades is increased to reach 5000 RPMs within 7-8 seconds, after which time the spin speed of the fan blades stabilizes at an RPM of 5240 within 17-18 seconds. While this example describes example RPMs and time frames, other RPMs and time frames may also be used. In some examples, stabilizing the spin speed of the fan blades refers to adjusting the fan blade spin speed to maintain the fan blade spin speed within a threshold range. For example, stabilizing the fan blade spin speed may include controlling the power supplied to the fan motor to minimize variations in the fan blade spin speed.

The sensors 106 are structured as one or more sensors that detect fan blade position and measure a speed of the spinning fan blades of the fan 104. In the present example, the sensors 106 include a first sensor to measure fan blade spin speed and a second sensor to detect a position of a fan blade.

In some examples, the first sensor is a tachometer that measures a fan blade spin speed. The tachometer may include, for example, a Hall-effect sensor that generates an electronic pulse every time a geared tooth passes its field of view. For example, the fan motor or other component of the fan may include the geared tooth that is monitored by the Hall-effect sensor. In other examples, the electronic pulses may be generated based on monitoring the one or more spinning fan blades themselves.

The fan speed may be calculated based on the electronic pulses, for example, by incrementing a number of electronic pulses per minute with each electronic pulse received, and using the number of electronic pulses to calculate a number of RPMs corresponding to the spinning blades of the fan. Accordingly, the first sensor of sensors 106 is structured to monitor the fan 104 to receive the electronic pulses that may be used to calculate fan blade spin speed.

In some examples, the second sensor is an infrared sensor that detects a fan blade position. The infrared sensor may include, for example, an infrared emitter directed at the fan blades that emits an infrared signal onto a reflective surface and detects a reflected infrared signal. The reflective surface may be, for example, one or more reflective adhesives positioned on one or more of the fan blades. A fan blade position may be detected, for example, by identifying when the reflected infrared signal is received by the infrared sensor. At the time the reflected infrared signal is received, the second sensor may identify that a fan blade with the reflective surface is positioned in front of the infrared emitter. Accordingly, the second sensor of the sensors 106 is structured to monitor the fan 104 to receive infrared signals reflected from the one or more fan blades that include the reflective adhesive. In some examples, a single fan blade is structured to reflect the infrared signals, while in other examples a plurality of the fan blades are structured to reflect the infrared signals. The position of the fan blades is relevant to the phase of the noise generated by the spinning fan blade, as will be described in further detail below.

While the first two sensors of sensors 106 are described as a Hall-effect sensor and an infrared sensor, other configurations of sensors may also be used to detect fan blade spin speed and fan blade position. For example, the infrared sensor may be structured to both identify fan blade position and the number of revolutions per minute of the fan blade to measure fan blade spin speed.

Figure 4:
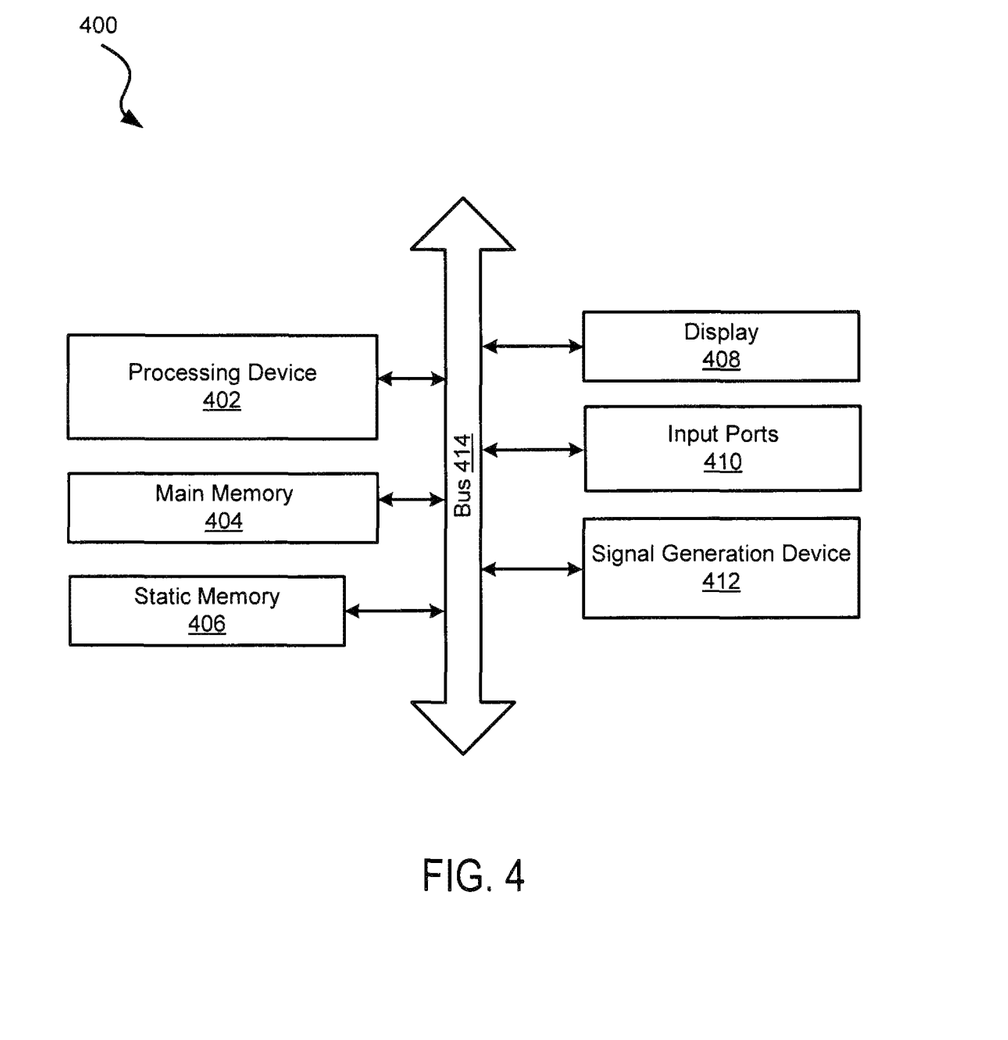
FIG. 4 is a schematic diagram of machine within which a set of instructions, for causing the machine to perform any one or more of the methodologies discussed herein, may be executed.

The sensors 106 are structured to communicate the fan blade position and fan blade spin speed information to a digital signal processor 108. An example architecture of the digital signal processor 108 is illustrated in FIG. 4.

The digital signal processor 108 is structured to receive the fan blade position detected by the sensors 106. The digital signal processor 108 is also structured to receive the fan speed measured by the sensors. While the digital signal processor 108 is described as being digital, in other examples the digital signal processor 108 may instead be an analog signal processor.

In the present example, the digital signal processor 108 is structured to calculate a blade passing frequency using the fan blade spin speed measured by the sensors 106. In some examples, the blade passing frequency is calculated by multiplying the fan speed (e.g., as measured in RPMs) by the number of fan blades to generate a product, and dividing the product by sixty.

The digital signal processor 108 is structured to generate a noise waveform based on the blade passing frequency. In the present example, the noise waveform is a sine wave. In other examples, the noise waveform may be another waveform, such as a cosine wave.

The digital signal processor 108 is structured to configure the noise waveform (e.g., the sine wave) with a phase that is determined based on the fan blade position. In some examples, the digital signal processor 108 initializes the noise waveform to begin at a time corresponding to the time the fan blade is detected at the position or at a preconfigured delay after the fan blade is detected at the position. Thus, the phase of the noise waveform is based upon the detected fan blade position.

The digital signal processor 108 is structured to generate an anti-noise waveform corresponding to the noise waveform. In some examples, the digital signal processor 108 generates the anti-noise waveform by shifting the phase of the noise waveform by 180 degrees, such that the anti-noise waveform is an inverse waveform to the noise waveform. Accordingly, the anti-noise waveform is configured to cause destructive interference with the noise waveform.

In some examples, digital signal processor 108 is structured to use the calculated blade passing frequency and phase to determine the anti-noise waveform without first determining the noise waveform. For example, digital signal processor 108 may be structured to perform one or more table lookups to query a predefined anti-noise waveform corresponding to the blade passing frequency and phase input values. In other examples, the digital signal processor 108 is structured to calculate the anti-noise waveform based on using the blade passing frequency and the input phase. For example, the sensors 106 may be structured to detect a position of the fan blade that corresponds to the phase of the anti-noise waveform. Thus, the phase that is input to the digital signal processor 108 may already be shifted from the noise waveform by 180 degrees.

In the present example, the digital signal processor 108 is structured with a preconfigured amplitude that is assigned to the anti-noise waveform. The preconfigured amplitude may be queried from a table using a table lookup function, using a fan blade spin speed as an input. In other examples, the digital signal processor 108 may calculate an amplitude of the anti-noise waveform based on the fan blade spin speed.

The digital signal processor 108 is structured to transmit the generated anti-noise waveform to a phase lock loop 110.

Because the measured fan blade spin speed and phase of the fan may fluctuate, the phase lock loop 110 may be used to dampen changes in the frequency and/or phase of the anti-noise waveform. In this way, a stabilized anti-noise waveform is produced that that has reduced frequency and/or phase variations. For example, stabilizing the anti-noise waveform may include reducing variations in the frequency and/or phase of the anti-noise waveform by adjusting the frequency and/or phase of the anti-noise waveform closer to an average frequency and/or average phase. In some examples, stabilizing the anti-noise waveform includes applying one or more filters to remove unwanted features from the anti-noise waveform. Unwanted features may include, for example, portions of the anti-noise waveform that deviate from other portions of the anti-noise waveform by a threshold amount, noise in the anti-noise waveform, and so forth.

The phase lock loop 110 is structured to receive the anti-noise waveform from the digital signal processor. In the present example, the phase lock loop 110 is structured as a component of the digital signal processor 108. In other examples, the phase lock loop 110 is structured as a component that is separate from the digital signal processor 108.

The phase lock loop 110 is structured to stabilize the anti-noise waveform at a stabilized phase. In some examples, the phase lock loop 110 is structured with an oscillator that generates a periodic signal. The phase lock loop 110 may be structured to compare the phase of the periodic signal with the anti-noise waveform to identify a phase difference between the periodic signal and the anti-noise waveform. The phase lock loop 110 is structured to reduce the phase difference, for example by pulling the frequency of the anti-noise waveform towards the periodic signal generated by the oscillator to generate a stabilized anti-noise waveform. The phase lock loop 110 is structured to output the stabilized anti-noise waveform to an amplifier 112.

The amplifier 112 is structured to receive the stabilized anti-noise waveform from the phase lock loop 110. The amplifier 112 is structured to amplify the stabilized anti-noise waveform to generate an amplified anti-noise waveform. The amplifier 112 is structured to input the amplified anti-noise waveform to a speaker 114.

The speaker 114 is structured to receive the amplified anti-noise waveform from the amplifier 112. The speaker 114 is structured to output the amplified anti-noise waveform to generate an audio anti-noise signal that cancels out at least of portion of the noise signal generated by the spinning fan blades. Accordingly, by cancelling at least a portion of the noise signal, the overall decibel level of the fan noise is reduced.

Figure 2:
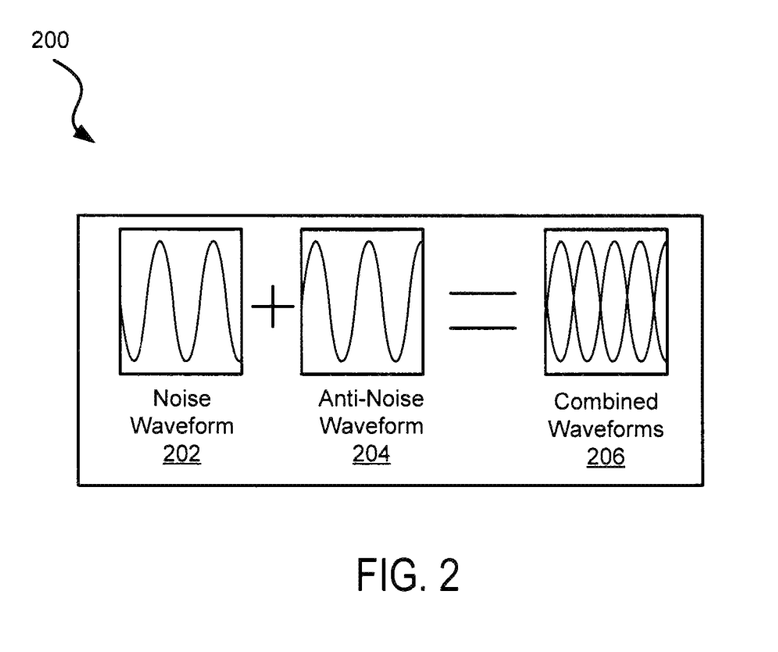
FIG. 2 is a diagram illustrating an example of a combined waveform that results from adding an anti-noise waveform and a noise waveform according to aspects of the present disclosure.

FIG. 2 is a diagram illustrating a combined waveform 206 that results from adding a noise waveform 202 and an anti-noise waveform 204 according to aspects of the present disclosure.

Block 202 represents a noise waveform generated by operation of a fan. For example, the noise waveform may correspond to an audible noise generated by the spinning of the fan blades at high speeds.

Block 204 represents an anti-noise waveform. The anti-noise waveform 204 may be generated as described with respect to FIGS. 1 and 3, such as by shifting a phase of the noise waveform by 180 degrees. The phase and frequency of the anti-noise waveform 204 may be generated by, for example, monitoring the fan using sensors to generate an output that is processed by a digital signal processor. In the present example, anti-noise waveform 204 is illustrated as having a same amplitude as the amplitude of the noise waveform 202. In other examples, the anti-noise waveform 204 may be configured with a different amplitude than the noise waveform 202.

In the present example, the anti-noise waveform 204 is output, such as by a speaker, to combine the anti-noise waveform 204 and the noise waveform 202.

Block 206 represents the combination of the noise waveform 202 and the anti-noise waveform 204. As shown in block 206, the phase difference of the waveforms is 180 degrees. The waveforms are structured to cause destructive interference, such that the noise waveform 202 is cancelled out by the anti-noise waveform 204 to reduce noise levels. The reduction in the waveforms may take the form of the combined waveform 206 reducing in amplitude towards zero over time. Accordingly, by combining the waveforms, the amplitude of the waveforms is decreased, thereby reducing and/or eliminating noise.

Figure 3:
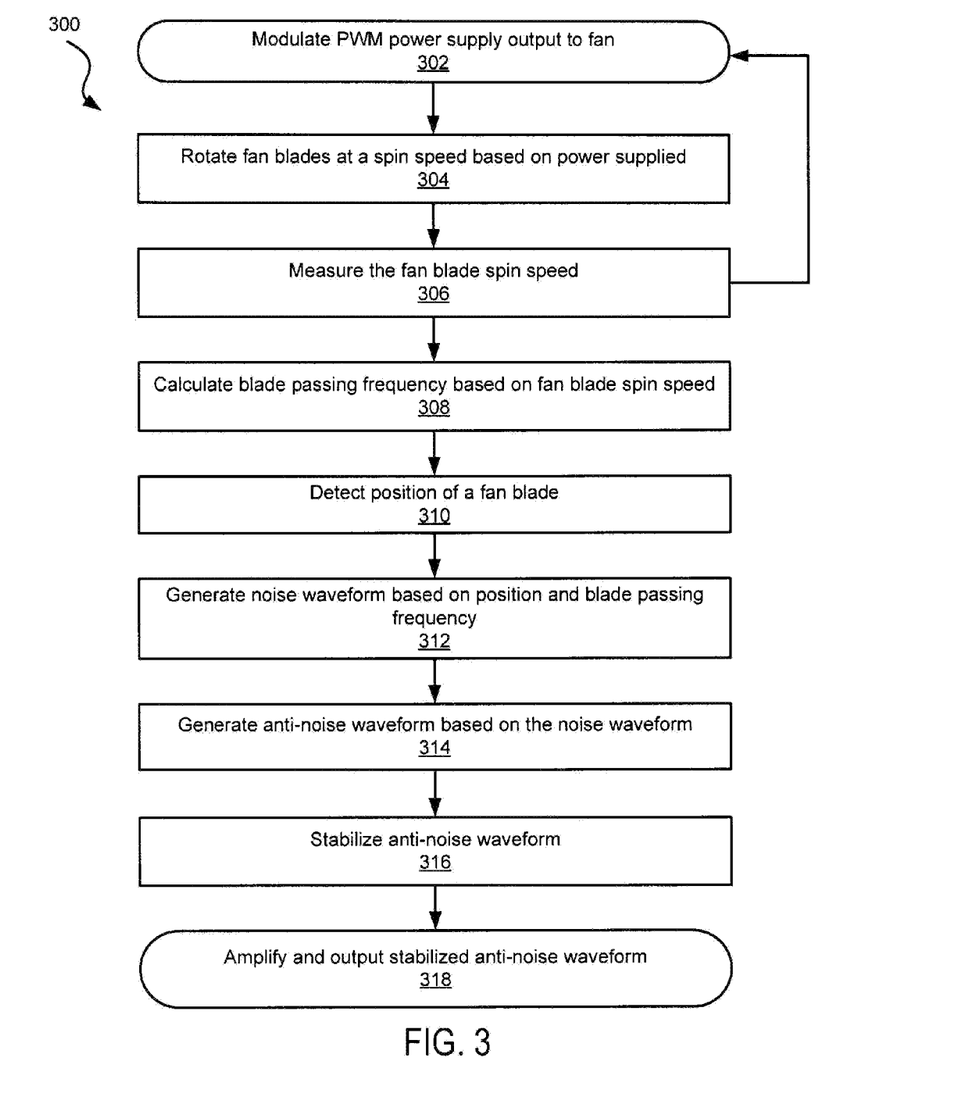
FIG. 3 is a flow diagram of a method for cancelling fan noise according to aspects of the present disclosure.

FIG. 3 is a flow diagram illustrating a method for cancelling fan noise according to some examples of the present disclosure. The method 300 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method 300, and some of the steps described can be replaced, eliminated and/or re-ordered for other embodiments of the method 300.

At action 302, a pulse width modulated (PWM) voltage signal is provided from a power supply to a fan. In particular, the PWM voltage may be provided to a fan motor to rotate fan blades. In some examples, the PWM voltage is output from the power supply at a 25 kHz frequency to a 30% duty cycle.

At action 304, the fan blades are rotated to a speed, based on the PWM voltage signal provided. In some examples, the fan speed reaches 5000 RPMs within 7-8 seconds and stabilizes at an RPM of approximately 5240 within 17-18 seconds.

At action 306, the fan blade spin speed is measured. In some examples, the fan blade spin speed is measured by a tachometer using a Hall-effect sensor that generates a pulse every time a geared tooth passes its field or area of view. In some examples, the number of pulses generated by the tachometer in a minute may be calculated to determine a revolutions per minute (RPMs) corresponding the fan. The RPMs may be calculated by, for example, calculating a number of pulses received from the Hall-effect sensor in a minute.

The fan blade spin speed may be provided back to the power supply via a feedback loop, such that the power supply may adjust the modulated PWM to stabilize the fan blade spin speed at a stable speed. For example, if the fan blade spin speed is measured as exceeding a predefined threshold, the duty cycle of the modulated PWM may be reduced, to reduce the power provided to the fan motor and thereby reduce the fan blade spin speed. In another example, if the fan blade spin speed is measured as being below a predefined threshold, the duty cycle of the modulated PWM may be increased, to increase the power provided to the fan motor and thereby increase the fan blade spin speed.

The spinning of the fan blades causes a noise that may be modeled by a waveform, such as a sine wave or a cosine wave. The frequency of the noise waveform thus depends on a number of fan blades passing a reference point in an amount of time.

At action 308, a blade passing frequency is calculated based on the measured fan blade spin speed. In the present example, the blade passing frequency may be calculated by multiplying the RPMs of the spinning fan blades by the number of fan blades and dividing the result by 60.

At action 310, a sensor detects a position corresponding to a fan blade. In some examples, the sensor is an infrared sensor that is coupled to the fan. The infrared sensor may emit an infrared signal at the fan blades. A fan blade may be configured with a reflective surface, such that the infrared signal is reflected from the fan blade to the infrared sensor. The infrared sensor may then detect the reflected infrared signal to determine that the fan blade is positioned in front of the infrared sensor. The position of the fan blade is used to identify the phase of the noise waveform and/or the anti-noise waveform.

At action 312, a noise waveform is generated corresponding to the blade passing frequency and the fan blade position. In the present example, the noise waveform is a sine wave that is generated by a digital signal processor that uses the blade passing frequency as the frequency of the sine wave. The fan blade position may be used by the digital signal processor to generate a phase for the sine wave. For example, the sine wave may begin at a point in time corresponding to when the fan blade is detected at the fan blade position. In some examples, the digital signal processor may perform one or more calculations and/or query one or more tables to generate the noise waveform. For example, the digital signal processor may generate a waveform by querying a lookup table that includes the steps corresponding to the frequency.

At action 314, the digital signal processor generates an anti-noise waveform corresponding to the noise waveform. In some examples, the digital signal processor generates the anti-noise waveform by shifting the phase of the noise waveform such that the anti-noise waveform is the anti-phase of the noise waveform. For example, the phase of the noise waveform may be shifted by 180 degrees. In other examples, the digital signal processor may also generate the anti-noise waveform using other techniques. For example, the digital signal processor may use the blade passing frequency and phase provided by the sensors to calculate and/or query one or more tables to determine the anti-noise waveform. In some examples, the digital signal processor determines the anti-noise waveform without performing the intermediary step 312 of determining the noise waveform. For example, the fan blade position may correspond to the phase of the anti-noise waveform rather than the noise waveform. In another example, the fan blade position may correspond to the phase of the noise waveform, but the phase may be converted to the phase of the anti-noise waveform by performing a table lookup and/or performing a calculation to shift the phase by 180 degrees.

In some examples, a noise waveform may include a plurality of frequencies. Accordingly the digital signal processor may generate more than one anti-noise waveform frequencies, which may be included to cancel/reduce the plurality of frequencies of the noise waveform. In some examples, the digital signal processor includes a function that may be performed to define the frequency or frequencies to be generated for the anti-noise waveform.

At action 316, the anti-noise waveform is stabilized. In some examples, the stabilizing of the anti-noise waveform is performed by a phase lock loop. The phase lock loop may be a component of the digital signal processor or a separate component. In the present example, stabilizing the anti-noise waveform refers to stabilizing a phase and/or frequency of the anti-noise waveform. The stabilizing may offer the advantage of reducing variations in the frequency and/or phase of the anti-noise waveform.

At action 318, the anti-noise waveform is amplified and output as an audio signal. The anti-noise waveform may be amplified, for example, using an amplifier and output using a speaker. The output audio signal corresponding to the anti-noise waveform is configured to cause destructive interference with the noise output from the fan, such that the fan noise is reduced/cancelled.

FIG. 4 illustrates a diagram of a machine in the form of a device 400 within which a set of instructions, for causing the machine to perform any one or more of the methodologies discussed herein, may be executed. Further, while a single machine is illustrated, the term "machine" shall also be taken to include any collection of machines that individually or jointly execute a set (or multiple sets) of instructions to perform any one or more of the methodologies discussed herein.

In the present example, the device 400 is configured as a digital signal processor, such as the digital signal processor 108 illustrated and described with respect to FIG. 1. The digital signal processor may be configured with instructions that are executed to perform aspects of a method, such as the method illustrated and described with respect to FIG. 3. Additionally, while an example configuration of a digital signal processor is shown, other configurations may also be used.

Device 400 includes a processing device (e.g., a processor) 402, a main memory 404 (e.g., flash memory, read-only memory (ROM), dynamic random access memory (DRAM) such as synchronous DRAM (SDRAM), double data rate (DDR SDRAM), or DRAM (RDRAM), and so forth), and a static memory 406 (e.g., flash memory, static random access memory (SRAM), and so forth), which communicate with each other via bus 414.

Processing device 402 represents one or more general-purpose processing devices such as central processing units, microprocessors, and so forth. Processing device 402 may also be one or more special-purpose processing devices such as an application specific integrated circuit (ASIC), a field programmable gate array (FPGA), a digital signal processor (DSP), network processor, and so forth.

Processing device 402 may also include one or more codec processing modules to encode and/or decode audio signals to particular formats for processing, playback, and/or transmission. Processing device 402 is configured to execute instructions for performing the operations and steps discussed herein.

Static memory 406 may include a non-transitory computer-readable storage medium on which is stored one or more sets of instructions (e.g., software) embodying any one or more of the methodologies or functions described herein. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The instructions in the non-transitory computer readable storage medium may also be stored, completely or at least partially, within main memory 404 and/or within processor 402 during execution thereof by computer system 400, main memory 404 and processor 402. While static memory 406 and main memory 404 are shown in an example to each be a single medium, the term "memory" should be taken to include a single memory medium or multiple memory media that store the one or more sets of instructions.

Device 400 also may include display 408 (e.g., LED, a liquid crystal display (LCD) or a cathode ray tube (CRT)), one or more input ports 410 (e.g., USB ports, serial or parallel interface ports, PCI interface, and so forth), and signal generation device 412 (e.g., a speaker, phase lock loop, and/or amplifier). These devices may be communicatively coupled to bus 414 directly or through one or more intermediary components.

Input ports 410 may include one or more ports for receiving information from external components. For example, the input ports 410 may receive information from sensors, which is processed by processing device 402 to perform operations based on the information received.

In some examples, signal generation device 412 is a separate component from device 400. In these examples that include a separate signal generation device, the device 400 is configured to include one or more ports to communicate with signal generation device 412.

While only one bus 414 is illustrated, bus 414 may represent one or more buses that communicatively couple components of the device 400. Further, while the illustration shows bus 414 as coupling all of the components, in other examples some components may be communicatively coupled to one another without being communicatively coupled to other components. For example, the signal generation device 412, input ports 410 and display 408 may not be directly communicatively coupled to one another, but rather may be communicatively coupled via another intermediary component, such as processing device 402.

The present embodiments can take the form of an entirely hardware embodiment, an entirely software embodiment, or an embodiment containing both hardware and software elements. In that regard, in some embodiments, the computing system is programmable and is programmed to execute processes including those associated with the processes of method 300 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, the digital signal processor 108 and/or one or more processors of other storage system components execute code to implement the actions described above.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
   rotating, in a storage system, a fan blade of a fan at a spin speed;
   measuring, by a first sensor, the spin speed;
   detecting, by a second sensor, a position of the fan blade, wherein the second sensor includes an infrared sensor to emit an infrared signal onto a reflective surface of the fan blade and to receive a reflected infrared signal from the reflective surface when the fan blade passes the infrared sensor;

generating, based on the spin speed and the position, an anti-noise waveform that is configured to cause destructive interference with a fan noise of the fan; and outputting an audio signal that corresponds to the anti-noise waveform.

2. The method of claim 1, wherein the first sensor is a Hall-effect sensor.

3. The method of claim 1 further comprising:
receiving, at a fan, a pulse width modulated signal from a power supply.

4. The method of claim 1, further comprising:
amplifying, by an amplifier, the anti-noise waveform; and
stabilizing, by a phase lock loop, the anti-noise waveform.

5. The method of claim 1, wherein the generating of the anti-noise waveform comprises:
calculating a blade passing frequency by dividing a numerator by sixty, wherein the numerator is a product of a number of fan blades of the fan and a number of revolutions per minute corresponding to the spin speed; and
generating a sine wave having the blade passing frequency and an anti-noise phase, wherein the anti-noise phase has a phase difference of 180 degrees from a phase of the fan noise.

6. The method of claim 1, wherein the audio signal is output by a speaker.

7. A method comprising:
rotating a fan blade of a fan at a spin speed;
measuring, by a first sensor, the spin speed;
receiving, at a power supply controller, the spin speed from the first sensor;
comparing, at the power supply, the spin speed with a threshold speed;
adjusting, at the power supply, a pulse width modulated signal to stabilize the spin speed;
detecting, by a second sensor, a position of the fan blade;
generating, based on the spin speed and the position, an anti-noise waveform that is configured to cause destructive interference with a fan noise of the fan; and
outputting an audio signal that corresponds to the anti-noise waveform.

8. The method of claim 1, wherein the anti-noise waveform is generated by performing at least one table lookup, wherein the at least one table lookup includes querying a table, and wherein an input for the querying includes a value corresponding to the spin speed or the position of the fan blade.

9. A non-transitory machine readable medium having stored thereon instructions for performing a method comprising machine executable code which when executed by at least one machine, causes the machine to:
determine a fan blade spin speed corresponding to a fan, wherein the fan includes one or more spinning fan blades that generate a fan noise having a noise waveform;
receive an identification of a position of a fan blade of the one or more spinning fan blades, wherein the identification of the position of the fan blade is received from an infrared sensor that emits an infrared signal towards the fan blade;
generate an anti-noise waveform having a frequency corresponding to the fan blade spin speed, wherein a phase of the anti-noise waveform is determined based on the identification of the position of the fan blade, and wherein the phase of the anti-noise waveform has a phase difference from the noise waveform that is configured to cause disruptive interference with the noise waveform; and
output the anti-noise waveform to an audio output device.

10. The non-transitory machine readable medium of claim 9, wherein the fan blade spin speed is determined based on electronic pulses received from a Hall-effect sensor.

11. The non-transitory machine readable medium of claim 9, the machine executable code further to cause the at least one processor to:
stabilize, by a phase lock loop, the anti-noise waveform.

12. The non-transitory machine readable medium of claim 9, wherein the anti-noise waveform is amplified by an amplifier prior to being output by the audio output device.

13. The non-transitory machine readable medium of claim 9, wherein generating the anti-noise waveform comprises:
calculating a blade passing frequency based on the fan blade spin speed and a count of the one or more spinning fan blades;
determining a phase of the anti-noise waveform based on the identification of the position of the fan blade of the one or more spinning fan blades; and
generating a sine wave having the blade passing frequency and phase.

14. The non-transitory machine readable medium of claim 9, wherein the anti-noise waveform is generated by performing at least one table lookup, wherein the at least one table lookup includes querying a table, and wherein an input for the querying includes a value corresponding to the fan blade spin speed or the position of the fan blade.

15. A computing device comprising:
a memory containing machine readable medium comprising machine executable code having stored thereon instructions for performing a method of cancelling fan noise;
a processor coupled to the memory, the processor configured to execute the machine executable code to cause the processor to:
receive a fan blade spin speed corresponding to a fan, wherein the fan includes one or more spinning fan blades that generate a fan noise having a noise waveform;
receive an identification of a position of a fan blade of the one or more spinning fan blades;
generate an anti-noise waveform having a frequency corresponding to the fan blade spin speed, wherein a phase of the anti-noise waveform is determined based on the identification of the position of the fan blade, wherein the phase of the anti-noise waveform has a phase difference from the noise waveform that is configured to cause disruptive interference with the noise waveform, and wherein generating the anti-noise waveform includes performing a table lookup with an input value corresponding to the fan blade spin speed or the position of the fan blade;
stabilize the anti-noise waveform; and
output the anti-noise waveform to an audio output device.

16. The computing device of claim 15, wherein generating the anti-noise waveform comprises:
calculating a blade passing frequency based on the fan blade spin speed and a number of the one or more spinning fan blades;
determining a phase of the anti-noise waveform based on the identification of the position of the fan blade of the one or more spinning fan blades; and generating a sine wave having the blade passing frequency and phase.

17. The computing device of claim 15, wherein the fan blade spin speed is received from a Hall-effect sensor, and wherein the identification of the position of the fan blade is received from an infrared sensor that emits an infrared signal towards the fan blade.

* * * * *